United States Patent
Amara et al.

(10) Patent No.: US 7,062,566 B2
(45) Date of Patent: Jun. 13, 2006

(54) SYSTEM AND METHOD FOR USING VIRTUAL LOCAL AREA NETWORK TAGS WITH A VIRTUAL PRIVATE NETWORK

(75) Inventors: Satish Amara, Mount Prospect, IL (US); Chandra Warrier, Schaumburg, IL (US); Ching Kung, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 10/279,364

(22) Filed: Oct. 24, 2002

(65) Prior Publication Data

US 2004/0083295 A1    Apr. 29, 2004

(51) Int. Cl.
*G06F 15/16* (2006.01)
*G06F 1/24* (2006.01)
*H04L 12/28* (2006.01)

(52) U.S. Cl. ............... 709/229; 709/249; 713/160; 370/395.21

(58) Field of Classification Search ............... 709/229, 709/236; 707/9, 10; 713/201, 202; 370/395.21
See application file for complete search history.

(56) References Cited

U.S. PATENT DOCUMENTS

| | | | | |
|---|---|---|---|---|
| 5,787,428 A * | 7/1998 | Hart | .............................. | 707/9 |
| 6,151,628 A | 11/2000 | Xu et al. | | |
| 6,253,321 B1 * | 6/2001 | Nikander et al. | ........... | 713/160 |
| 6,330,562 B1 * | 12/2001 | Boden et al. | .................. | 707/10 |
| 6,425,085 B1 * | 7/2002 | Hashikura | ................... | 713/202 |
| 6,438,612 B1 * | 8/2002 | Ylonen et al. | .............. | 709/249 |
| 6,539,483 B1 * | 3/2003 | Harrison et al. | ............ | 713/201 |
| 6,587,466 B1 * | 7/2003 | Bhattacharya et al. | . . | 370/395.21 |
| 6,708,218 B1 * | 3/2004 | Ellington et al. | ........... | 709/236 |

OTHER PUBLICATIONS

IEEE Std 802.Q-1998, "IEEE Standards For Local and Metropolitan Area Networks: Virtual Bridged Local Area Networks", IEEE Computer Society. Dec. 1998.
Internet Engineering Task Force (IETF), Requests For Comments (RFC) 2386, "A Framework For QoS-Based Routing In the Internet", Aug. 1998.

(Continued)

*Primary Examiner*—John Follansbee
*Assistant Examiner*—Philip Lee
(74) *Attorney, Agent, or Firm*—McDonnell Boehnen Hulbert & Berghoff LLP

(57) ABSTRACT

An exemplary system and method for using a network access system, such as a virtual private network (VPN), are provided. A user device may have a user session with a home agent. Additionally, an initiating security gateway may be in communication with the home agent, and a terminating security gateway may be in communication with the initiating security gateway via a tunnel (e.g., Internet Protocol in Internet Protocol (IP-in-IP) or Internet Protocol security (IPsec) tunnel). Further, a virtual local area network (VLAN) tag associated with the user session may map to a selector operable in a security policy database. The selector may be used to find a security policy defining an IPsec procedure, and the security policy may be applied to the tunnel. Also, the initiating security gateway may also include a Quality of Service (QoS) module that determines QoS markings for a packet traveling along the tunnel.

32 Claims, 9 Drawing Sheets

OTHER PUBLICATIONS

Internet Engineering Task Force (IETF), Requests For Comments (RFC) 2401, "Security Architecture For the Internet Protocol", Nov. 1998.

Internet Engineering Task Force (IETF), Requests For Comments (RFC) 2408, "Internet Security Association and Key Management Protocol (ISAKMP)", Nov. 1998.

Internet Engineering Task Force (IETF), Requests For Comments (RFC) 2409, "The Internet Key Exchange (IKE)", Nov. 1998.

Internet Engineering Task Force (IETF), Requests For Comments (RFC) 2764, "A Framework For IP Based Virtual Private Networks", Feb. 2000.

Internet Engineering Task Force (IETF), Requests For Comments (RFC) 2865, "Remote Authentication Dial In User Service (RADIUS)", Jun. 2000.

Internet Engineering Task Force (IETF), Requests For Comments (RFC) 2868, "RADIUS Attributes For Tunnel Protocol Support", Jun. 2000.

Internet Engineering Task Force (IETF), Requests For Comments (RFC) 3168, "The Addition of Explicit Congestion Notification (ECN) to IP", Sep. 2001.

International Search Report for PCT Application Serial No. PCT/US03/33643, Dated May 11, 2004.

* cited by examiner

SYSTEM AND METHOD FOR USING VIRTUAL LOCAL AREA NETWORK TAGS WITH A VIRTUAL PRIVATE NETWORK

FIELD OF INVENTION

This invention relates to network access systems. More specifically, it relates to a system and method for accessing a virtual private network utilizing virtual local area network tags.

BACKGROUND OF INVENTION

Network access systems are becoming increasingly important in modern society. People from around the world may now utilize networks such as the Internet to remotely exchange data, information, and ideas. Further, network access systems may be important to companies and businesses worldwide. Many corporations have corporate local area networks (LANs) that employees and clients may remotely access. Additionally, network access systems are often utilized in electronic commerce, such as during Internet transactions, credit card transactions, and Automated Teller Machine (ATM) withdrawals.

Virtual private networks (VPNs) are emerging as an important type of network access system. VPNs may enable users to remotely connect to private LANs via public networks (e.g., the Internet). Before VPNs, large-scale private wide area networks (WANs) were often utilized for remote connections to a LAN, though such networks were often costly and required a complicated network topology. VPNs may provide the advantage of extending the network connectivity of LANs beyond their physical limits while reducing cost and simplifying network topology.

Since a VPN may use a public connection to transmit private data, a mechanism for securing data transmitted across such a network may be beneficial. In recent years, the Internet Protocol Security suite (IPsec) has emerged as an important standard for securing data transferred across a VPN. IPsec can utilize a number of encryption technologies (e.g., Diffie-Helman key exchange, public key cryptography) and authentication technologies (e.g., digital certificates) for securing packet-switched data. An IPsec header may contain an authentication header that helps ensure the integrity of transmitted data, and an encapsulated security payload (ESP) for securing transmitted data.

Furthermore, VPNs may utilize Quality of Service (QoS) to enable network service providers to offer differentiated levels of service to different users. For example, network service providers may use QoS to set a maximum latency, minimum bandwidth, and other such parameters for data transmitted across a VPN for a particular user. Furthermore, network service providers may charge a rate proportional to the QoS level (e.g., a lower rate for a basic service, and a higher rate for a premium service). A Type of Service (ToS) byte within a header of an IP packet may be utilized for specifying QoS. Furthermore, a variety of known protocols (e.g., Resource Reservation Setup Protocol (RSVP)) may be used to implement QoS in VPNs.

Despite these advantages, however, current VPNs that utilize IPsec and/or QoS may face a number of drawbacks. First, prior art systems, such as those utilizing RSVP, are typically not scalable. Furthermore, prior art VPNs using IPsec and QoS may not effectively load balance transmitted data, causing widespread delays and inefficient network usage. Additionally, prior art VPNs may not enable users to customize IPsec policy for different user domains and/or user sessions. Thus, all users may be offered the same level of security regardless of their individual security needs.

Accordingly, it is desirable to have a system and method for accessing a VPN that overcomes the above deficiencies associated with the prior art by utilizing virtual local area network (VLAN) tags.

SUMMARY

A system, device, and method for utilizing VLAN tags with a network access system, such as a VPN, are provided. An exemplary network access system may include a home agent in communication with a user device via a user session. Furthermore, an initiating security gateway may be in communication with the home agent. In addition, a terminating security gateway may be in communication with the initiating security gateway via a tunnel. Further, a VLAN tag associated with the user session may map to a selector operable in a security policy database.

In another aspect of the present embodiment, a method for transmitting a packet via an initiating security gateway may include receiving a packet including a virtual local area network tag and mapping the virtual local area network tag to a selector. Further, the method may include mapping the selector to a security policy stored within a security policy database. In addition, the method may include performing an IPsec procedure based on the security policy, and transmitting the packet to the terminating security gateway across a tunnel.

In yet another aspect of the present embodiment, a network system is provided. The network system may include a home agent in communication with a user device via a user session, and an access server that authenticates the user device and provides a virtual local area network tag for the user session to the home agent. Additionally, the network system may include an initiating security gateway that receives a packet including the virtual local area network tag from the home agent. The initiating security gateway may also include a selector table mapping the virtual local area network tag to a selector. Additionally, the network system may include a security policy database that maps the selector to at least one security policy defining an Internet Protocol security procedure, and the Internet Protocol security procedure may be applied to the packet. Furthermore, the network system may also include a receiving network having a terminating security gateway that receives the packet from the initiating security gateway via a tunnel.

In another aspect of the present embodiment, an initiating security gateway may include a selector module having a filtering mechanism for identifying a virtual local area network tag within a packet. Additionally, the selector module may also include a selector table for mapping the virtual local area network tag to a selector. The initiating security gateway may also include a security policy database for mapping the selector to an Internet Protocol security policy. Furthermore, the initiating security gateway may also include an Internet Protocol Security module for applying the Internet Protocol security policy to the packet while sending the packet to a terminating security gateway.

DETAILED DESCRIPTION

I. Exemplary Network Access System

Figure 1:
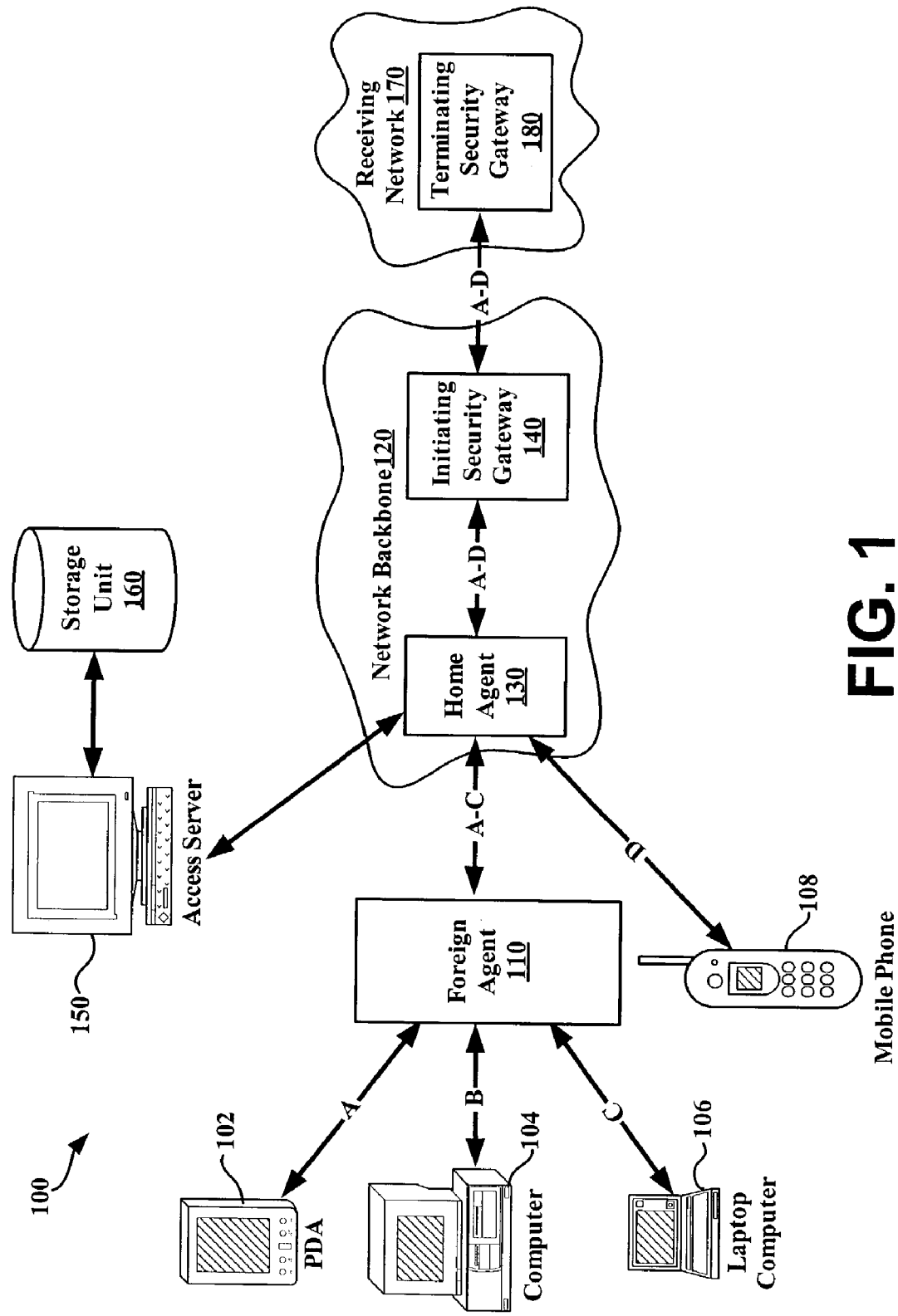
FIG. 1 shows a block diagram overview of an exemplary embodiment of a virtual private network (VPN)

In an exemplary network access system (e.g., VPN), a user device (e.g., computer, mobile phone) may establish a user session with a receiving network (e.g., corporate LAN, Internet). The user session may pass through a network backbone (e.g., Internet Service Provider (ISP)) having an initiating security gateway. Further, the user session may utilize a tunnel between the initiating security gateway and a terminating security gateway within the receiving network. IPsec procedures may be performed on packets transmitted along the tunnel during the user session.

A. Exemplary Use of Security Associations and IPsec

Before applying IPsec procedures to packets, a security association (SA) may be established for the user session. An SA may define authentication and encryption keys to be used by IPsec, as well as key lifetimes and key replacement procedures.

An SA may be uniquely identified by a security protocol identifier, an IP destination address, and a security parameter index (SPI). The security protocol identifier may identify the type of protocol(s) used by IPsec and may include an authentication header (AH) and/or encapsulated security payload (ESP). The SPI may be a random number (e.g., 32-bit value) that is communicated between the initiating and terminating security gateways. For more information on mechanisms for creating an SA, one can refer to Request for Comments (RFC) 2408, "Internet Security Association and Key Management Protocol (ISAKMP)", and RFC 2409, "The Internet Key Exchange (IKE)", respectively, the contents of which are incorporated in their entirety herein by reference.

After an SA has been established, packets utilizing IPsec may be transmitted along the secure user session. AHs may be used with packets to help ensure the integrity of the transmitted data (e.g., to certify that a packet has not been tampered with). Additionally, or alternatively, ESPs may be used for encrypting and securing a packet.

In addition, IPsec may be used in a transport mode, where packet data (but not the IP header) is encrypted. Alternatively, IPsec may be used in a tunnel mode, where the entire packet including the header is encrypted. A packet using IPsec may include a region called a selector for determining what part of the packet to encrypt or authenticate. When sending the packet from an initiating security gateway to the receiving network, an attempt may be made to match the selector specified within the packet to a set of selectors that correspond to IPsec policies and are stored within a security policy database (SPD). If a matching selector is found within the SPD, then its corresponding IPsec policy may be applied to the packet. For more information on IPsec, one can refer to RFC 2401, "Security Architecture for the Internet Protocol", the contents of which are incorporated in its entirety herein by reference.

B. Assigning VLAN Tags to Exemplary User Sessions

A virtual local area network (VLAN) may be a network of devices that are on different physical LAN segments but act as if they are connected to the same wire. VLAN tags may be headers within a frame that are used for identifying the VLAN which the device sending the frame belongs to. For more information on VLANs and VLAN tags, one can refer to Institute for Electrical and Electronics Engineers (IEEE) 802.1q, the contents of which are incorporated in their entirety herein by reference.

In the present embodiment, a VLAN tag may be assigned to a new user session created between a user device and the receiving network. Packets subsequently sent by the user device that utilize the user session may include the assigned VLAN tag. When an initiating security gateway within the network backbone receives a packet from the user device, it may extract the VLAN tag from the packet. The current IPsec protocol generally does not allow the use of VLAN tags as selectors within an SPD. However, the VLAN tag may be provided to a selector table in order to find a corresponding selector (e.g., IP address or network domain name), and the selector may be provided to the SPD to obtain an IPsec policy. The selector and/or VLAN tag may also be used to obtain QoS markings that are subsequently applied to the packet.

After an IPsec policy has been obtained from the SPD, the initiating security gateway may perform IPsec procedures (e.g., creating an AH, ESP, IPsec tunnel) on the packet, and transmit the packet via a tunnel (e.g., IP-in-IP or IPsec tunnel) to a terminating security gateway within the receiving network. The terminating security gateway may then perform a reverse IPsec procedure on the packet, which may include decrypting and authenticating the packet based on the SPI, destination address, and security protocol identifier (e.g., AH or ESP).

Additionally, a second SPD within the terminating security gateway may then be searched for a value that matches an identification parameter specified within the packet (e.g., domain name or IP address for the user device). If no value matching the identification parameter is found, the packet may be dropped. If a matching value is found, the packet may be forwarded to a final destination as specified by its destination address.

For packets sent from the network to the user device utilizing the user session, IPsec procedures may be performed by the terminating security gateway, and a tunnel (e.g., IP-in-IP or IPsec tunnel) may be created to the initiating security gateway. A reverse IPsec procedure may then be performed within the initiating security gateway, and the packet may then be forwarded to the user device.

The present embodiments may include a number of advantages. VLAN tags may be used in the network access system for providing differentiated IPsec and/or QoS capabilities for packets sent along the tunnel during the user sessions. Additionally, the VLAN tags may enable load balancing of packet-switched data within the network access system. Further, the VLAN tags may provide greater flexibility to changes in the topology of the network access system.

II. Exemplary VPN

Turning now to the drawings, FIG. 1 is a block diagram overview of an exemplary VPN 100, though any remotely accessible network or network access system may be used in alternate embodiments. The VPN 100 includes a network backbone 120 having a home agent 130 in communication with an initiating security gateway 140. One or more user devices 102, 104, 106 may be in communication with the home agent 130 via a foreign agent 110. Additionally, one or more user devices 108 may be in direct communication with the home agent 130. Furthermore, an access server 150 may be in communication with the home agent 130, and a storage unit 160 may be connected to the access server 150. The initiating security gateway 140 may also communicate with a terminating security gateway 180 within a receiving network 170 (e.g., LAN). In the present embodiment, each of the user devices 102–108 engages in a single user session "A–D", respectively, with the terminating security gateway 180, though multiple concurrent user sessions for a user device are also possible. For more information on network access systems and VPNs, one can refer to the commonly owned U.S. Pat. No. 6,151,628 and RFC 2764, "A Framework for IP Based Virtual Private Networks", the contents of which are incorporated in their entirety herein by reference.

A. Exemplary Communication Mechanisms and User Devices

A variety of communication mechanisms may be used with the user devices 102–108. For example, the user devices 102–108 may utilize a dial-up (e.g., modem) connection mechanism for user sessions with the home agent 130. A variety of alternate connection mechanisms, including wireless, Ethernet, DSL, and cable connection mechanisms, may also be. utilized. Furthermore, any number of tunneling mechanisms (e.g., IPsec, Layer 2 Tunneling Protocol (L2TP), Point-to-Point Tunneling Protocol (PPTP)) may also be utilized for these connections.

The connection mechanisms between other components within the VPN 100 are preferably Ethernet connections upon which Transmission Control Protocol/Internet Protocol (TCP/IP) and/or Universal Datagram Protocol (UDP)/IP packets may be sent. Further, in an exemplary embodiment, the connection between the security gateways 140, 180 may be an IP-in-IP or IPsec tunnel, as will be described later. It should be understood that any other connection known in the art that enables communication between network devices may also be utilized in the present embodiment.

The user devices 102–108 may include any device capable of connecting to the receiving network 170. In the present embodiment, the user device 102 may be a Personal Digital Assistant (PDA), the user device 104 may be a desktop computer, the user device 106 may be a laptop computer utilizing a wireless link, and the user device 108 may be a mobile phone. It should be understood that a variety of other user devices (e.g., videophones, facsimile machines, printers) may also be used with the present embodiment. Furthermore, although four (4) user devices are shown in the present embodiment, any number of different user devices may be utilized in the VPN 100, and these user devices may form part of a LAN.

The foreign agent 110 may enable the user devices 102, 104, 106 to access the home agent 130 from a remote location. For example, the user devices 102, 104, 106 may use the foreign agent 110 for their user sessions A–C if they are in a region not serviced by the home agent 130. The foreign agent 110 may then forward these user sessions A–C through the home agent 130. In a present embodiment, the foreign agent 110 may be a Packet Data Serving Node (PDSN), but any known device having such functionality may alternatively be utilized (e.g., IP Routers, Wireless LAN Access Nodes, InterWorking Units (IWU)).

Additionally, it should be noted that the user devices 102, 104, 106, 108, the foreign agent 110, and/or the home agent 130 may communicate via any type of wireline (e.g., Ethernet) or wireless communication technology (e.g., Code-Division Multiple Access 2000 (CDMA2000), Global System for Mobile Communications (GSM), General Packet Radio Service (GPRS), Universal Mobile Telecommunications System (UMTS), 3G, WEEE 802.11, etc.). To illustrate, in an exemplary embodiment, the user device 102 may use antennas, packet control functions (PCFs), base transceiver stations (BTSs), base station controllers (BSCs), and/or mobile switching centers (MSCs) for wirelessly communicating with the foreign agent 110 (e.g., PDSN) via CDMA2000 wireless technology.

B. Exemplary Network Backbone

The network backbone 120 preferably enables the user devices 102–108 to communicate with the receiving network 170. In the present embodiment, the network backbone 120 may include an Internet Service Provider (ISP). ISPs and network backbones are well known in the art, and a variety of different commercial ISPs are in existence today, such as AOL-Time Warner, Inc. (New York, N.Y.) and United Online, Inc. (Westlake Village, Calif.). In the present embodiment, the network backbone 120 may be a connection point of the VPN 100, through which most components directly or indirectly communicate. It should be understood that the above recitation of commercial network backbones is meant to illustrate, not limit, the spirit and scope of the present embodiment.

The home agent 130 may be a software or hardware entity within a remote access server (RAS) that the user devices 102–108 remotely access in order to communicate with the receiving network 170. Additionally, the home agent 130 may be in communication with the access server 150, and include a timeout mechanism (not shown) in order to timeout a connection to the access server 150 if it is not responsive. In the present embodiment, the home agent 130 may be installed at a central office (CO) of a telephone company. Further, the home agent 130 may be capable of connecting and disconnecting thousands of user sessions from devices such as user device 108 and/or the foreign agent 110. An exemplary home agent 130 for use in the present embodiment may be a software program running on the Total Control Enterprise Network Hub incorporating an integral general purpose computing platform, e.g., the HiPerAr™ card, both of which are commercially available from the present assignee, 3COM Corporation. This computing platform card may allow the home agent 130 to run a commercially available stand-alone operating system, such as a standard operating system or a custom operating system designed for the exemplary VPN 100.

Additionally, the home agent 130 may utilize other remote access software products, such as RADIUS (Remote Authentication Dial In User Service) or DIAMETER software. These protocols may be utilized during communication with the access server 150. Further, previously described connection mechanisms may also utilize the RADIUS protocol, which is described in RFC 2865, "Remote Authentication Dial In User Service (RADIUS)", the contents of which are incorporated in its entirety herein by reference. It should be understood that a number of other commercially available or known home agents and connection protocols may also be utilized with the present embodiment.

Figure 2:
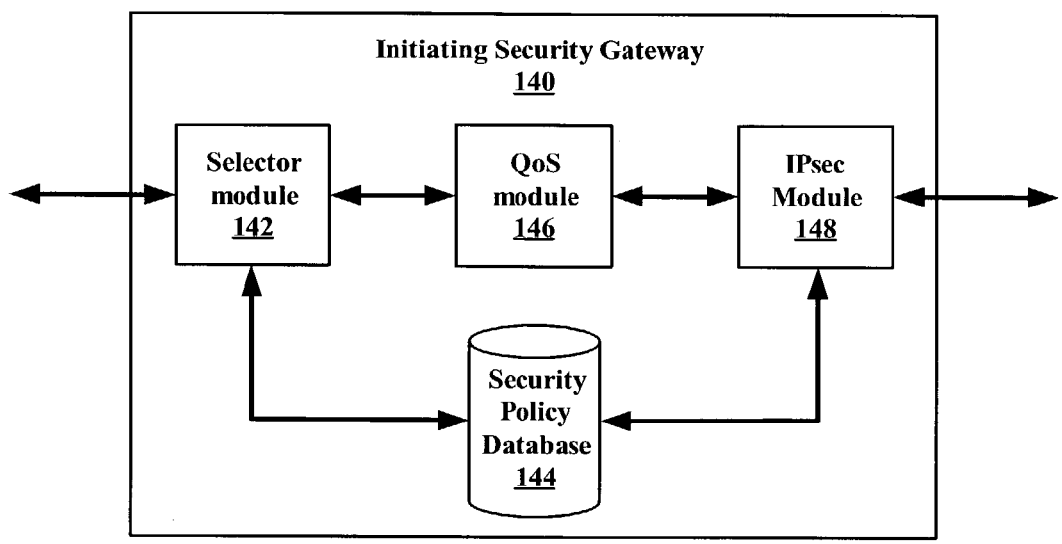
FIG. 2 shows a more detailed block diagram of an exemplary initiating security gateway of the VPN of FIG. 1.

The initiating security gateway 140 may be any type of gateway device capable of creating a connection (e.g., tunnel) with the receiving network 170. The initiating security gateway 140 may also be capable of adding QoS markings and performing IPsec procedures on a packet. As shown in FIG. 2, an exemplary embodiment of an initiating security gateway 140 may include a selector module 142, SPD 144, QoS module 146, and IPsec module 148. These exemplary components 142–148 will be described in more detail shortly.

C. Exemplary Access Server and Storage Unit

Turning back to FIG. 1, the access server 150 may be any type of server or computing device that performs authentication and access authorization for user devices 102–108 connecting to the receiving network 170. Consistent with the RADIUS protocol, the access server 150 may receive an access-request packet from the network device 110, and may respond with an access-accept packet or an access-reject packet (packets not shown). The format of access-request, access-accept, and access-reject packets is described within RFC 2865.

The access server 150 may use a variety of different mechanisms to authenticate the user devices 102–108. One method of authorization includes telephone number or International Mobile Subscriber Identifier (IMSI) authentication, where the access server 150 may validate the telephone number of the user device 102–108 that dials in to the home agent 130. Thus, connection requests from user devices 102–108 with telephone numbers outside the coverage of the network backbone 120 may be immediately rejected, forwarded to another network backbone (not shown), or forwarded to another access server.

Additionally, or alternatively, the access server 150 may utilize a username/password authentication mechanism, where the user devices 102–108 may submit a username and password that are subsequently analyzed by the access server 150. If the access server 150 determines that the username and password are not valid, the requested connection may be rejected with an access-reject packet. If the username and password are valid, the access server 150 may enable the corresponding user device 102–108 to access the receiving network 170 through an access-accept packet. If the access server 150 is unavailable or unable to process the username and password that it has received, it may ask the home agent 130 to try a connection with another access server. Alternatively, other technologies may also be utilized for authenticating a user, such as face recognition, signature recognition, retina recognition, and DNA analysis. It should be understood that multiple access servers may be utilized in alternate embodiments and that some access servers, while operating independently, may operate on a single computing device or be integrated within a single housing.

The storage unit 160 may be a relational database, or any other mechanism known in the art for storing data. Alternatively, an SRAM, DRAM, buffer, magnetic hard disk drive, or optical memory may be used as a storage unit 160 in the present exemplary embodiment. The storage unit 160 preferably stores and matches usernames and passwords, as well as other data (e.g., phone numbers) that may be used for identification and authentication of the user devices 102–108. Thus, the access server 150 may be in communication with and read data from the storage unit 160 when validating a user device 102–108. Additionally, when a new user device is added to the list of user devices 102–108 that are authorized to access the receiving network 170, the access server 150 may record the new identification and authorization information (e.g., username, password, phone number, etc.) in the storage unit 160. Alternatively, this new data may be written to the storage unit 160 by other machines or input devices, such as a computer or user keypad (not shown). Additionally, it should be understood that identification and authentication information for user devices 102–108 may be split among different storage areas, or that different storage areas may store redundant data.

Furthermore, the access server 150 and/or storage unit 160 may assign a VLAN tag to the new user session during authorization. The storage unit 160 may include a table mapping VLAN tags to domain names and/or terminating security gateways within the receiving network 170. Thus, the VLAN tag may be assigned to the new user session depending on the domain and/or terminating security gateway it will pass through within the receiving network 170 en route to its destination. To illustrate, in an exemplary scenario, a new user session may be created for the user device 106 after it is authenticated and authorized to access the receiving network 170 by the access server 150. The access server 150 may then provide the user device 106 with a VLAN tag associated with a terminating security gateway 180 that is en route to the final destination of the user session. The VLAN tag may then be saved within a mobility binding record (MBR) associated with the new user session within any number of different locations within the VPN 100, such as within the user device 106 and/or home agent 130. The MBR may also include a variety of other types of information, such as the address of the foreign agent 110, location and IP address of the user device 106, type of tunneling scheme used between the user device 106 and the foreign agent 110, IP address of the initiating security gateway 140, and lifetime of the MBR.

Continuing with the exemplary scenario, the VLAN tag associated with the new user session may be included in packets sent from the user device 106 to the initiating security gateway 140. In an exemplary embodiment, the home agent 130 may add the VLAN tags to the packets, although other elements within the VPN 100 (e.g., user device 106, foreign agent 110) may additionally or alternatively add the VLAN tags. As will be described later, the VLAN tags within the packets may be mapped to a selector table within the initiating security gateway 140 to find a corresponding selector. The selector may then be used to determine security policies and/or QoS markings for the packets.

D. Exemplary Receiving Network and Terminating Security Gateway

In the present embodiment, the receiving network 170 may be a corporate LAN that is accessible from the network backbone 120. Of course, other types of networks (e.g., WANs or Asynchronous Transfer Mode (ATM) networks) may additionally or alternatively be utilized.

The terminating security gateway 180 within the receiving network 170 may be similar to the initiating security gateway 140. In the present embodiment, the terminating security gateway 180 may include an SPD, IPsec module, and QoS module (components not shown). Preferably, the SPD within the terminating security gateway 180 is statically configured to match the SPD 144 within the initiating security gateway 140, but dynamic configuration schemes and differences between the SPDs are possible. Further, the terminating security gateway 180 may also include a selector module similar to the selector module 142, though this is not utilized in the present embodiment.

When the terminating security gateway 180 receives a packet from the initiating security gateway 140, it may perform a reverse IPsec procedure on the packet. The reverse IPsec procedure may include terminating the tunnel (e.g., IP-in-IP or IPsec) for the packet, decrypting the encapsulated security payload and checking the authentication header for the integrity of the packet. After the reverse IPsec procedure has been performed, the packet may be forwarded to its final destination depending on its destination IP address.

III. Exemplary Initiating Security Gateway

Turning now to FIG. 2, an exemplary embodiment of the initiating security gateway 140 is shown in more detail. As described previously, the initiating security gateway 140 may include the selector module 142, SPD 144, QoS module 146, and IPsec module 148. More or fewer components may be used for the initiating security gateway 140 in alternate embodiments, or various components may be combined. For example, in an alternate embodiment, the SPD 144 may be part of the selector module 142 or may be external to the initiating security gateway 140. Further, any of the components 142–148 may be software and/or hardware based, depending on their desired functionality.

A. Exemplary Selector Module

The selector module 142 may include a filtering mechanism for identifying VLAN tags within packets. In the present embodiment, the selector module 142 may use the filtering mechanism to read and/or extract VLAN tags from packets sent from the user devices 102–108 to the initiating security gateway 140. The VLAN tags may be stored within any portion (e.g., MAC header) of the packets and may take any value, such as between 1 and 4095. Furthermore, the selector module 142 may include a selector table that maps VLAN tags to selectors. These selectors may be subsequently used to find security policies within the SPD 144. Exemplary selectors and selector tables that may be used in the present embodiment will be described in more detail shortly.

B. Exemplary Security Policy Database

The SPD 144 may be a relational database, but alternatively, may include a static random access memory (SRAM), dynamic random access memory (DRAM), buffer, magnetic hard disk drive, optical memory, or any other storage mechanism known in the art. In the present embodiment, the SPD 144 may store different IPsec policies mapped to selectors. By providing a specific selector to the SPD 144, a matching IPsec policy may be found. The IPsec policy may be subsequently applied to corresponding packets passing through the initiating security gateway 140, as will be described later in an exemplary method.

C. Exemplary QoS Module

In the present embodiment, the QoS module 146 may be in communication with the selector module 142 and the IPsec module 148. The QoS module 146 may also include a QoS table mapping QoS markings to VLAN tags included within the packets. Alternatively, or additionally, the QoS table may map the QoS markings to the selectors determined within the selector module 142. Thus, depending on the VLAN tag and/or selector provided to the QoS module 146, the QoS table may include a matching set of QoS markings may be provided. The QoS module 146 may then mark packets with matching QoS markings to indicate the desired service parameters of the packet-switched data (e.g., minimum throughput, maximum latency). Different user domains or user sessions may have different QoS parameters and thus, packet switched data for each user domain or session may be marked differently. In the present embodiment, QoS markings may be placed within the Type of Service (ToS) byte field within the IP packet header, though any portion of the packet may be marked in alternate embodiments. Further, the QoS table mapping the QoS markings may alternatively be stored within another component inside the initiating security gateway 140 (e.g., the SPD 144), and the QoS module 146 may communicate with that component in order to obtain the proper QoS markings. For more information on QoS, one can refer to RFC 2386, "A Framework for QoS-based Routing in the Internet", the contents of which are incorporated in its entirety herein by reference.

D. Exemplary IPsec Module

The IPsec module 148 may be used to initiate an IPsec tunnel between the initiating security gateway 140 and the terminating security gateway 180. Alternatively, or additionally, other tunneling mechanisms (e.g., IP-in-IP, L2TP, PPTP) may be utilized between the gateways 140, 180, and IPsec may be utilized in a transport mode. Further, the IPsec module 148 may add an authentication header (AH) to packets passing through to help ensure the integrity of transmitted data. The IPsec module 148 may also encrypt the packet data and add an encapsulating security payload (ESP) to the header. For more information on IPsec, one can refer to the previously cited RFC 2401.

IV. Exemplary Connection between Gateways within the VPN

Figure 3:
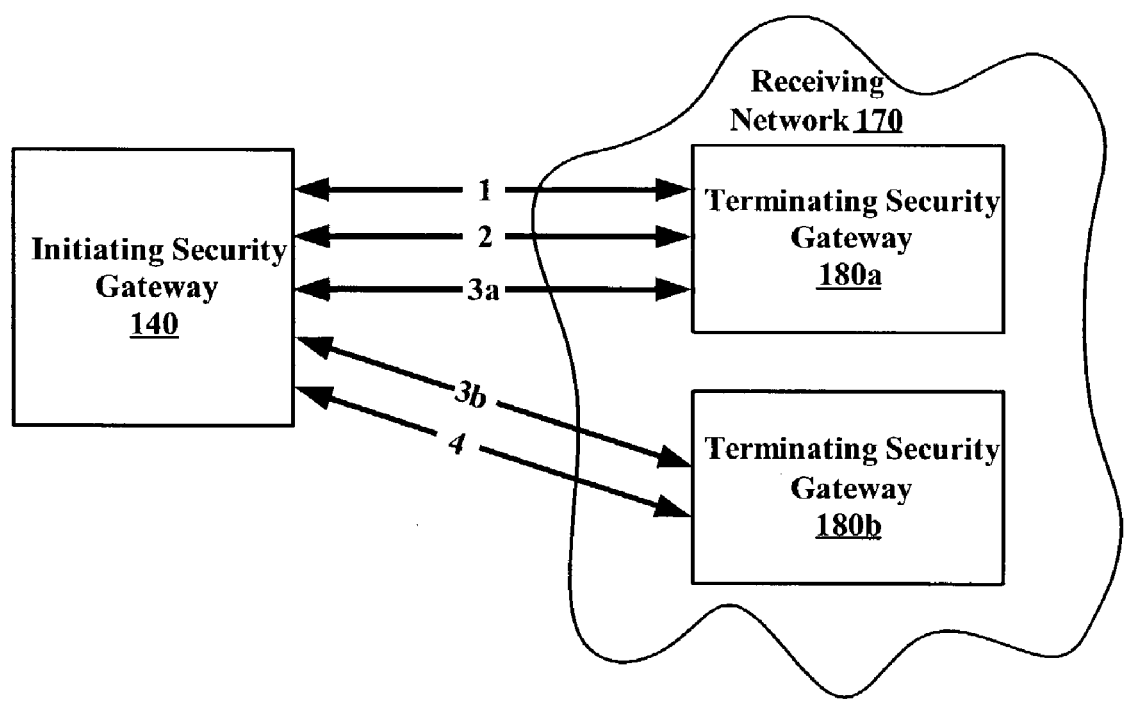
FIG. 3 shows a more detailed block diagram of connections between an exemplary initiating security gateway and terminating security gateway of the VPN of FIG. 1.

FIG. 3 shows exemplary connections between the initiating security gateway 140 and terminating security gateways 180a, 180b within the receiving network 170. It should be understood that the terminating security gateways 180a, 180b are preferably substantially similar to the previously described terminating security gateway 180. As shown in FIG. 3, packets containing VLAN tags of "1", "2" and "3" may be forwarded from the initiating security gateway 140 to the terminating security gateway 180a along connections "1". "2", and "3a", respectively. Similarly, packets containing VLAN tags of "3" or "4" may be forwarded from the initiating security gateway 140 to the terminating security gateway 180b along connections "3b" and "4", respectively. Although shown as separate connections, the connections "1"–"3a" and "3b"–"4" may share the same physical transmission lines. Further, it should be noted that a packet having a single VLAN tag (e.g., "3") may be mapped to more than one terminating security gateway 180a, 180b within the same receiving network 170.

Using the present VPN configuration, differentiated QoS and/or IPsec procedures may be applied to packets having different VLAN tags. In an exemplary scenario, VLAN tags "1" and "4" may correspond to a basic level of QoS and/or IPsec service, VLAN tag "2" may correspond to an intermediate level of QoS and/or IPsec service, and VLAN tag "3" may correspond to a premium level of QoS and/or IPsec service. In the present scenario, each of the VLAN tags "1"–"4" directs a corresponding packet to the same receiving network 170. However, the actual VLAN tag assigned to a user session may affect the level of QoS and IPsec protection for the user session.

Additionally, the present configuration may enable load balancing of data traffic within the VPN 100. For example, at a given time, user sessions utilizing VLAN tag "1" may be transmitting an especially high number of packets. At the same time, user sessions utilizing VLAN tag "4" may be transmitting a very low number of packets, possibly due to the termination of an abnormally large number of user sessions that utilize VLAN tag "4". If the QoS and IPsec levels are the same for user sessions associated with VLAN tags "1" and "4", the access server 150 or other network component may intelligently assign new user sessions to VLAN tag "4" (corresponding to terminating security gateway 180b) in order to load balance the data traffic and prevent an overload on terminating security gateway 180a.

V. Exemplary Intermediate Components within the VPN

Figure 4:
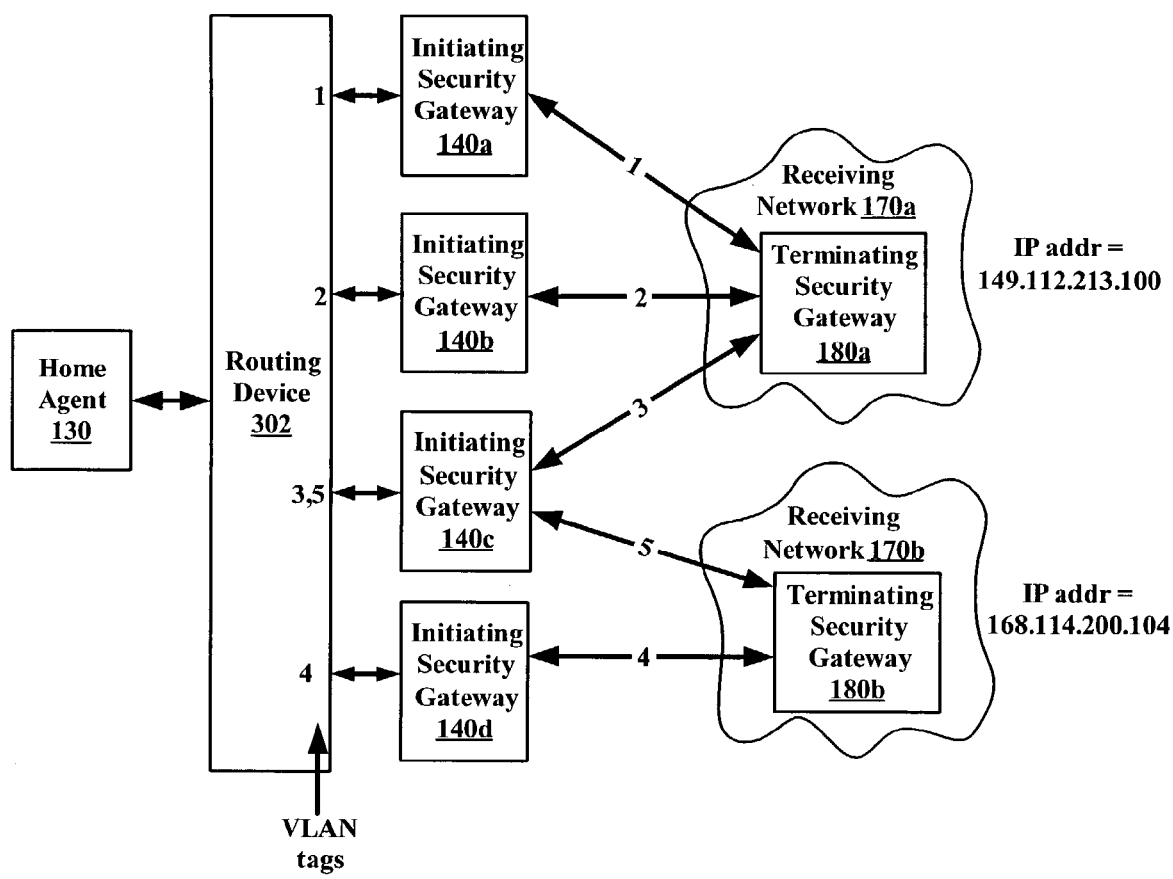
FIG. 4 shows a more detailed block diagram of exemplary intermediate components within the VPN of FIG. 1.

Turning now to FIG. 4, another exemplary embodiment of the VPN 100 is shown having exemplary intermediate components. In the present embodiment, the home agent 130 may be in communication with a routing device 302 (e.g., switch or router). The routing device 302 may be further in communication with initiating security gateways 140a–d, which may be in communication with the terminating security gateways 180a, 180b within the receiving networks 170a, 170b, respectively. It should be understood that the initiating security gateways 140a–d, receiving networks 170a–b, and terminating security gateways 180a–b are preferably substantially the same as the previously described initiating security gateway 140, receiving network 170, and terminating security gateway 180, respectively. Furthermore, the initiating security gateways 140a–d may communicate with one another and/or other elements within the VPN 100 to facilitate load balancing. Also, the terminating gateways 180a–b may have IP addresses of "149.112.213.100" and "168.114.200.104", respectively, though any other type of address may alternatively be used. It should be further understood that any number of these or other components may be utilized in alternate embodiments. For example, additional switch(es) and compression server(s) may alternatively be utilized between the home agent 130 and the routing device 302.

In the present embodiment, the routing device 302 may forward packets from the home agent 130 to the initiating security gateways 140a–d depending on the VLAN tags contained within the packet. For example, if a packet has a VLAN tag of 1, the routing device 302 may route the packet to the initiating security gateway 140a. Alternatively, if the packet has a VLAN tag of either a 3 or a 5, the packet may be forwarded to initiating security gateway 140c. It should be evident that any number and combination of forwarding scenarios may be used in the present embodiment.

Once a packet reaches one of the initiating security gateways 140a–140d, it may be copied and/or forwarded to one or more of the terminating security gateways 180a–b. Preferably, an IP-in-IP tunnel or IPsec tunnel is created at this stage in order to transport the packet. After the packet reaches one or more of the receiving networks 170a–b, it may be forwarded to its appropriate destination (e.g., as specified by its destination IP address). An exemplary method of sending a packet from a user device to a receiving network will be described shortly.

Similar to the previous exemplary embodiment, the access server 150 may assign VLAN tags to new user sessions in order to create differentiated QoS and/or IPsec services. Also, VLAN tags may also be intelligently assigned to enable load balancing of data traffic among the initiating security gateways 140a–d and terminating security gateways 180a–b.

VI. Exemplary Network Domains within VPN

Figure 5:
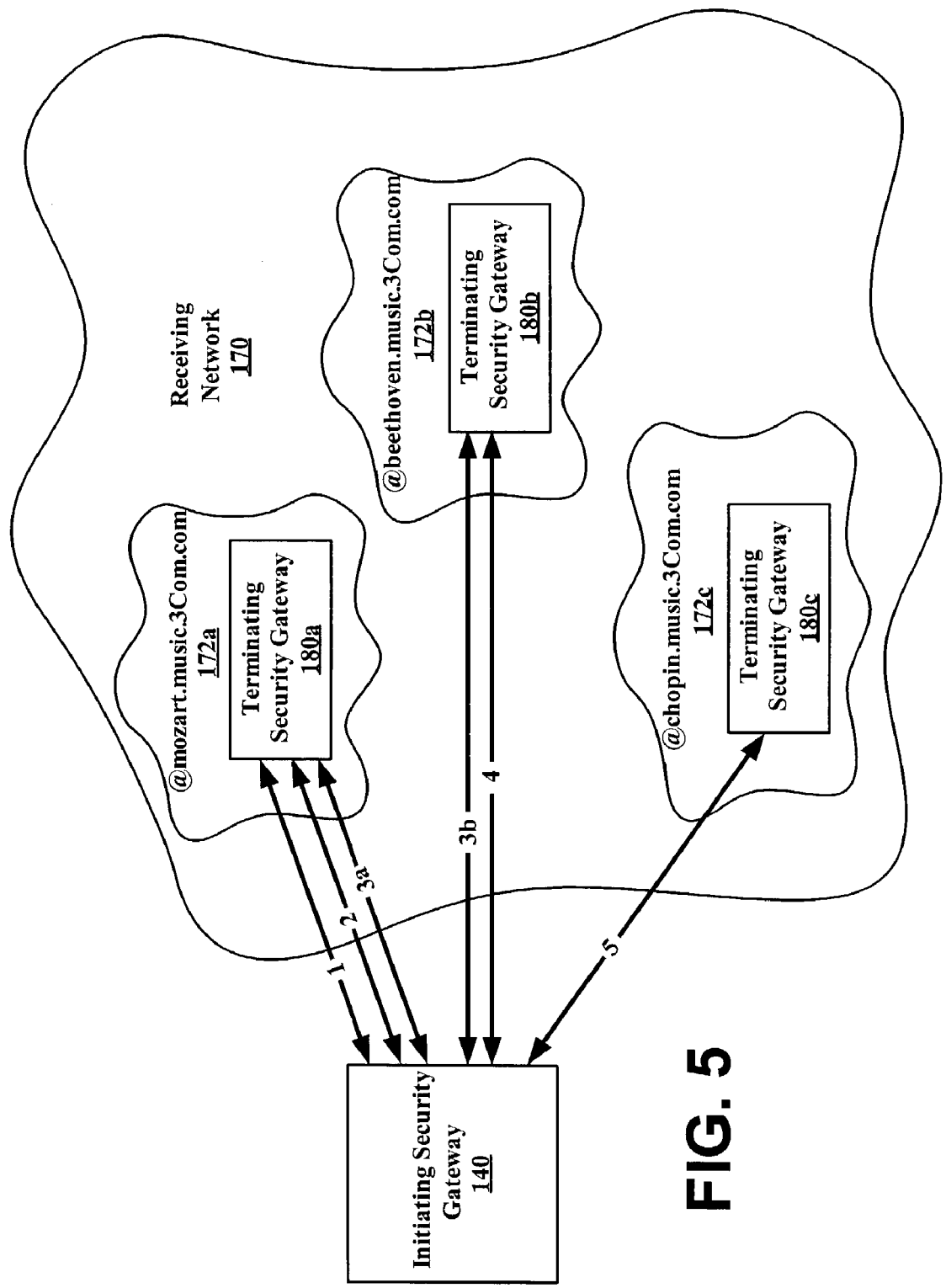
FIG. 5 shows a more detailed block diagram of exemplary network domains within the VPN of FIG. 1.

Turning now to FIG. 5, an exemplary embodiment of the VPN 100 is shown with a number of network domains 172a–c forming part of the receiving network 170. In the present embodiment, packets including VLAN tags "1"–"5" may be received by the initiating security gateway 140. Although shown as separate connections, the connections "1"–"3a" and "3b"–"4" may share the same physical transmission lines. These VLAN tags may be mapped to network domain names (e.g., "@mozart.music.3com.com", "@beethoven.music.3com.com", "@chopin.music.3com.com") within the selector table. For example, packets including a VLAN tag of "5" may be forwarded to the network domain "@chopin.music.3com.com", and packets including a VLAN tag of "3" may be copied and/or forwarded to network domains "@mozart.music.3com.com", and "@beethoven.music.3com.com". It should be understood that any number and type of network domains and domain names may be used with the present embodiment.

The network domain names may be used as selectors into the SPD 144 for finding a corresponding IPsec policy and/or a corresponding TSGA. For example, if the domain name "@mozart.music.3com.com" is used as a selector to the SPD 144, a corresponding IPsec policy and address of the corresponding terminating security gateway 180a may be found. It should be understood that any number of terminating security gateways and network domains may map to one another. Additionally, the QoS module 146 may use the network domain name, VLAN tag, and/or QoS table to find QoS markings for the packet. Further, the IPsec module 148 may create a tunnel (e.g., IPsec tunnel) from the initiating security gateway 140 to the terminating security gateway 180a, and the packet may then be forwarded to the proper destination depending on the original destination address of the packet.

VII. Exemplary Selector Table and Selectors

Figure 6:
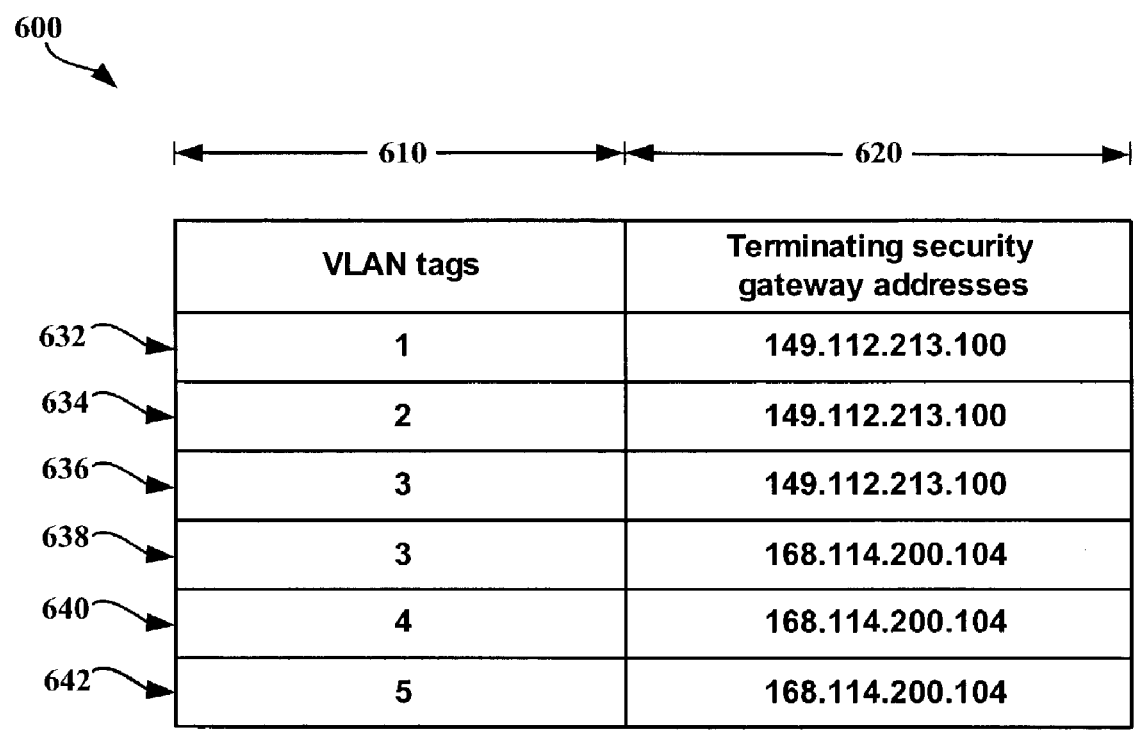
FIG. 6 shows an exemplary selector table stored within the initiating security gateway of FIG. 2 mapping virtual local area network (VLAN) tags to terminating security gateway addresses.

FIG. 6 shows an exemplary selector table 600 mapping VLAN tags 610 to terminating security gateway addresses (TSGAs) 620 for the terminating security gateways 180a–b in FIG. 4. In the present embodiment, the TSGAs 620 may be used as selectors to the SPD 144, though a number of other types of selectors may also be used, such as a source or destination IP address (e.g., IP version 4 (IPv4) or IP version 6 (IPv6)), user identification (e.g., a fully qualified user name string or X.500 distinguished name), system name (e.g., host or security gateway name), data sensitivity level (e.g., IP Security Option (IPSO)/Commercial IPSO (CIPSO) labels), transport layer protocol (e.g., obtained from the IPv4 "Protocol" or IPv6 "Next Header" fields), and source and destination (e.g., TCP or UDP) ports. As shown in the selector table 600, multiple VLAN tags may map to the same TSGA (e.g., entries 632, 634, 636 and entries 638, 640, 642), and one VLAN tag may map to multiple TSGAs (e.g., entries 636, 638). Further, a VLAN tag and a TSGA may uniquely map to one another.

Corresponding to the exemplary embodiment shown in FIG. 4, each of the initiating security gateways 140a–d may include the entire selector table 600. Alternatively, each initiating security gateway 140a–d may store a portion of the selector table 600 relevant to the VLAN tag(s) associated with that initiating security gateway 140a–d. For example, the initiating security gateway 140a may store entry 632 corresponding to VLAN tag "1", and the initiating security gateway 140c may store entries 636, 638, and 642, corresponding to VLAN tags "3" and "5".

Although the TSGAs may use IP addresses in the present embodiment, other types of addressing (e.g., Media Access Control (MAC)) may also be utilized. Furthermore, it should be noted that within the current IPsec protocol, VLAN tags are not usable as selectors. Thus, the present embodiment may be used to provide a method of differentiating IPsec policy by using VLAN tags.

VII. Exemplary Method of Packet Transmission

Figure 7:
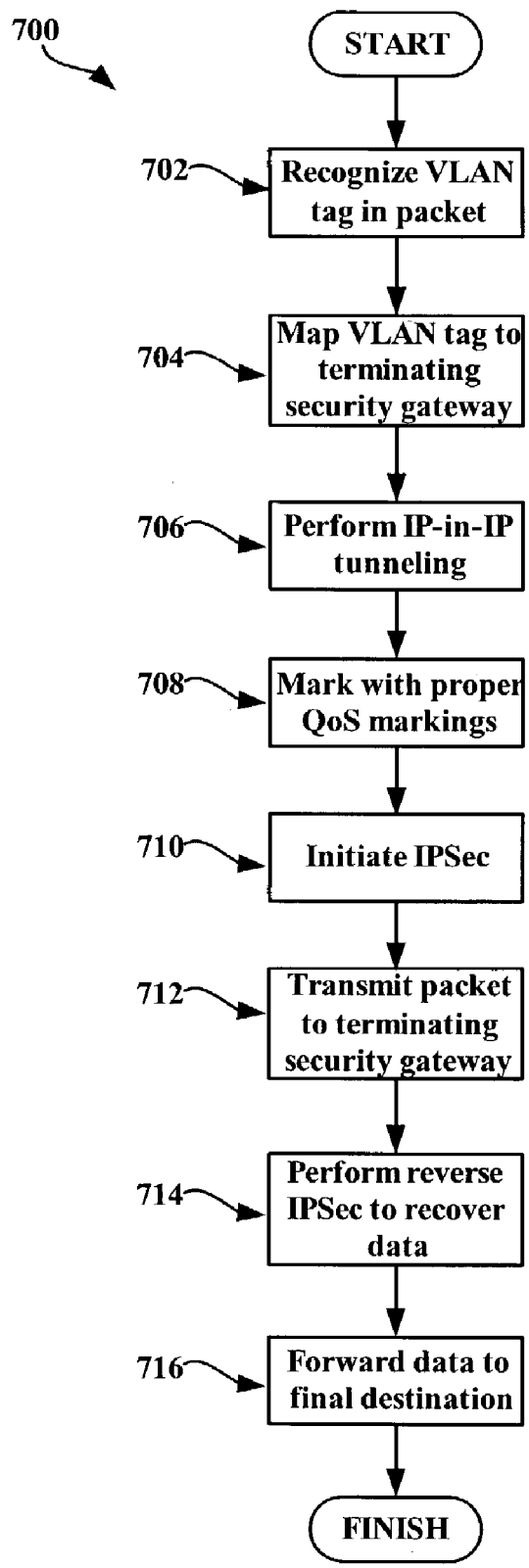
FIG. 7 shows an exemplary method of transmitting data from an initiating security gateway to a terminating security gateway of the VPN of FIG. 1 using the table of FIG. 6.

FIG. 7 shows an exemplary method 700 of transmitting data within the VPN 100 using the selector table 600 and the exemplary configuration shown in FIG. 4. Although the present method 700 describes a user session "A" for the user device 102, it should be understood that the method 700 may alternatively be applied to any number and type of user sessions and devices, with any number of different configurations for the VPN 100.

In the present method 700, the user device 102 may already have established an SA and a user session "A" with the terminating security gateway 180a within the receiving network 170a. The user device 102 may also already be authenticated and authorized by the access server 150 to access the receiving network 170a. Further, the access server 150 may have already provided a VLAN tag (e.g., VLAN tag "1") for the user session "A".

In the first step 702, the user device 102 may send a packet to the home agent 130 during the user session "A". The home agent 130 may include the VLAN tag in the packet and forward the packet to the selector module 142 within the initiating security gateway 140a. The selector module 142 may utilize the selecting mechanism (e.g., filter) for recognizing and obtaining the VLAN tag value within the packet.

In the following step 704, the VLAN tag may be mapped to one or more of the TSGAs 620 within the selection table 600. In the present embodiment, the VLAN tag may correspond to a TSGA that is the address of the terminating security gateway 180a. This TSGA may then be used as a selector within the SPD 144.

Additionally, in step 706, the selection module 142 may perform IP-in-IP tunneling on the packet. Thus, the selection module 142 may add a destination address to the packet header that corresponds to the address of the terminating security gateway 180a. The selection module 142 may also add a source address to the packet header that corresponds to the address of the initiating security gateway 140a.

In step 708, the packet may be forwarded to the QoS module 146, where the packet may be marked by QoS markings. The QoS module 146 may add the QoS markings to the ToS byte or other field within the packet. Furthermore, the QoS markings for the packet may be determined by querying the QoS table with the selector (e.g., TSGA) and/or VLAN tag.

In the following step 710, the packet may be forwarded to the IPsec module 148, which may initiate IPsec procedures on the packet. The IPsec module 148 may use the address of the terminating security gateway 180a as a selector within the SPD 144 in order to extract a corresponding IPsec policy. The IPsec module 148 may then apply the IPsec policy to the packet, which may include adding an authentication header and/or encapsulated security payload to the packet header. The IPsec policy may also specify additional tunneling mechanisms (e.g., IPsec tunnel) to be implemented on top of the IP-in-IP tunnel.

In step 712, the packet may be transmitted from the initiating security gateway 140a to the terminating security gateway 180a across the IP-in-IP tunnel. In the following step 714, the terminating security gateway 180a may perform a reverse IPsec procedure, which may include decapsulating the tunneled packet, decrypting the packet, checking the authentication header to help ensure the integrity of the packet data, and comparing the selector within the packet to selectors within the locally stored SPD.

In step 716, the packet may then be forwarded to its final destination, as specified by the packet's original destination address. The final destination may be located internal or external to the network 170a.

For packets sent from the terminating security gateway 180a to the user device 102 utilizing the user session "A", the terminating security gateway 180a may perform IPsec procedures on the packets and create a tunnel (e.g., IP-in-IP or IPsec tunnel) to the initiating security gateway 140a. A reverse IPsec procedure may then be performed within the initiating security gateway 140a, and the packet may be forwarded to the user device 102.

IX. Another Exemplary Selector Table

Figure 8:
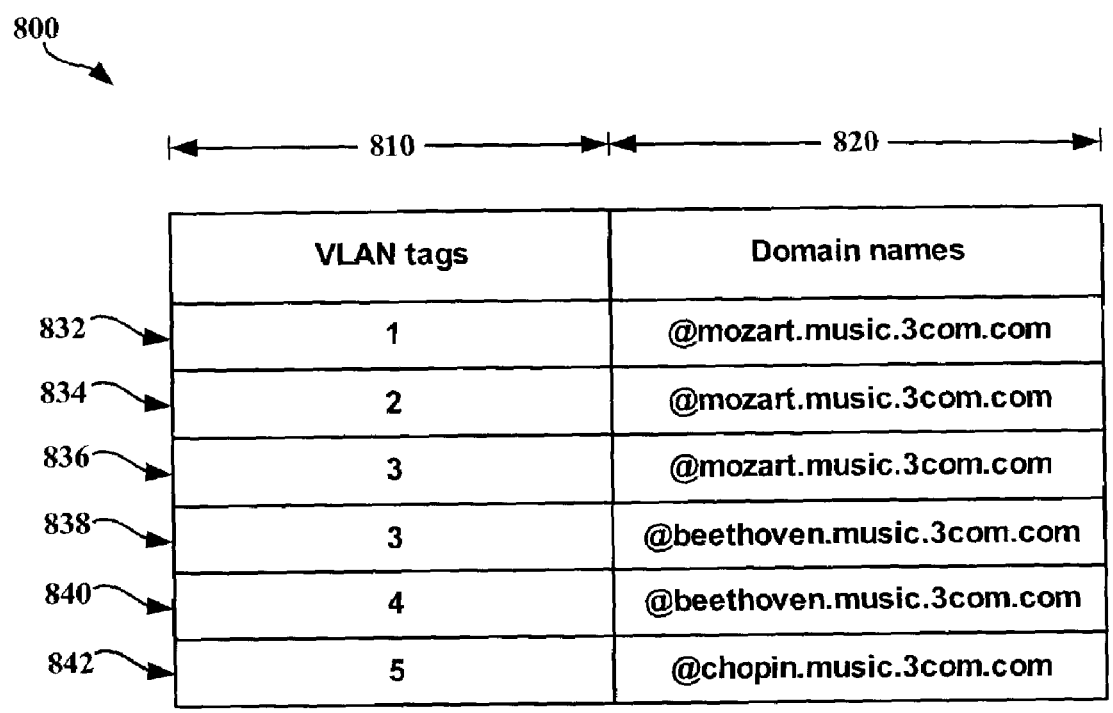
FIG. 8 shows an exemplary selector table stored within the initiating security gateway of FIG. 2 mapping VLAN tags to network domains within the VPN.

Turning now to FIG. 8, a second selector table 800 is shown having VLAN tags 810 corresponding to domain names 820. The selector table 800 may be substantially similar to the table 600 except that the TSGAs 620 have been replaced with domain names 820 corresponding to the network domains 172a–c as shown in FIG. 5. For example, as shown in entry 832, a VLAN tag of "1" may correspond to the network domain 172a that has the domain name "@mozart.music.3com.com".

Additionally, the domain names 820 may be used as selectors within the SPD 144. It should be understood that the domain names 820, as well as the TSGAs 620, are merely exemplary, and that any type or number of such selectors may be utilized with the present embodiment.

X. Exemplary Selector Table Configuration

A network administrator may statically configure a selector table (e.g., selector tables 600, 800) within the initiating security gateway 140 to match the table within the storage unit 160 used for assigning VLAN tags. Alternatively, a selector table may be dynamically configured and matched to the table within the storage unit 160. In a dynamic configuration scheme, a change in the table within the storage unit 160 may trigger the same change within the selector table. Such a change may be communicated between the storage unit 160 and the initiating security gateway 140 using any type of communication medium (e.g., Ethernet, wireless communications, etc.). A dynamic configuration scheme may be advantageous, since a change in the storage unit table (e.g., caused by a change in network configuration) may automatically cause a change within a selector table (e.g., selector tables 600 or 800), thus reducing the need for manual reconfiguration of the selector table.

XI. Another Exemplary Method of Packet Transmission

Figure 9:
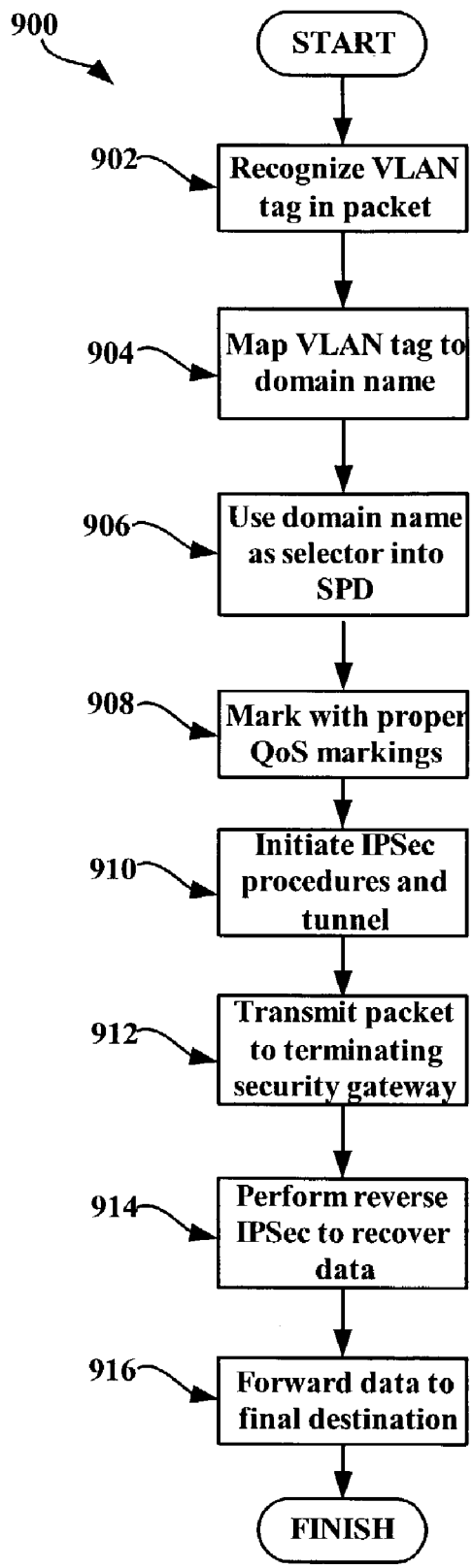
FIG. 9 shows an exemplary method of transmitting data from an initiating security gateway to a terminating security gateway of the VPN of FIG. 1 using the table of FIG. 8.

FIG. 9 shows another exemplary method 900 of transmitting data within the VPN 100 using the selector table 800 and the exemplary configuration shown in FIG. 5. The present method 900 is preferably substantially similar to the previously described method 700 except that the domain names 820 may be used as selectors within the SPD 144 instead of the TSGAs 620. Furthermore, although the present method 900 describes a user session "A" for the user device 102, it should be understood that the method 900 may alternatively be applied to any number and type of user sessions and devices, with any number of different configurations for the VPN 100.

In the present method 900, the user device 102 may already have established an SA and a user session "A" with the terminating security gateway 180a within the receiving network 170a. The user device 102 may also already be authenticated and authorized by the access server 150 to access the receiving network 170a. Further, the access server 150 may have already provided a VLAN tag (e.g., VLAN tag "1") for the user session "A".

In the first step 902, the user device 102 may send a packet to the home agent 130 during the user session "A". Furthermore, the home agent 130 may add to the packet a VLAN tag (e.g., "1") that is assigned to the user session "A". The home agent 130 may then forward the packet to the selector module 142 within the initiating security gateway 140. The selector module 142 may utilize the selecting mechanism (e.g., filter) for recognizing and extracting the VLAN tag within the packet.

In the following step 904, the VLAN tag may be mapped to one or more of the domain names 820 within the selection table 800. As shown in FIG. 8, the VLAN tag "1" may correspond to the domain name "@mozart.music.3com.com". In step 906, this domain name may be used as a selector within the SPD 144.

In step 908, the packet may be forwarded to the QoS module 146, where the packet may be marked by QoS markings. The QoS module 146 may add the QoS markings to the ToS byte or other field within the packet. Furthermore, the QoS markings for the packet may be determined by querying the QoS table with the selector (e.g., domain name) and/or VLAN tag.

In the following step 910, the packet may be forwarded to the IPsec module 148, which may initiate IPsec-procedures on the packet. The IPsec module 148 may use the domain names (e.g., "@mozart.music.3com.com") as a selector within the SPD 144 in order to extract a corresponding IPsec policy. The IPsec module 148 may then apply the IPsec policy to the packet, which may include adding an authentication header and/or encapsulated security payload to the packet header. Furthermore, the IPsec module 148 may initiate an IPsec tunnel between the initiating security gateway 140 and the terminating security gateway 180a in order to forward the packet to the network domain 172a (having the domain name "@mozart.music.3com.com").

In step 912, the packet may be transmitted from the initiating security gateway 140 to the terminating security gateway 180a across the IPsec tunnel. In the following step 914, the terminating security gateway 180a may perform a reverse IPsec procedure, which may include decapsulating the tunneled packet, decrypting the packet, checking the authentication header to help ensure the integrity of the packet data, and comparing the selector within the packet to selectors within the locally stored SPD.

In step 916, the packet may then be forwarded to its final destination, as specified by the packet's original destination address. The final destination may be located internal or external to the receiving network 170.

For packets sent from the terminating security gateway 180a to the user device 102 utilizing the user session "A", IPsec procedures may be performed by the terminating security gateway 180a, and a tunnel (e.g., IP-in-IP or IPsec tunnel) may be created to the initiating security gateway 140. A reverse IPsec procedure may then be performed within the initiating security gateway 140, and the packet may be forwarded to the user device 102.

The present embodiments may provide a number of advantages. First, by utilizing VLAN tags for identifying user domains or user sessions, differentiated tunneling and/or Quality of Service capabilities may be specified by the user for each of these sessions. Additionally, the use of VLAN tags may enable a flexible network topology that is easily scalable as the number of user devices changes. Furthermore, by mapping VLAN tags to user sessions, the present embodiments may allow a convenient and organized way of assigning priorities to different user domains or user sessions. Additionally, the present embodiments may enable load balancing of packet switched-data through a VPN though the use of VLAN tags.

It should be understood that a wide variety of additions and modifications may be made to the exemplary embodiments described within the present application. For example, more or fewer components (e.g., switches) may be utilized with the VPN 100 depending on its desired functionality. Further, in an alternate embodiment, the home agent 130 and the initiating security gateway 140 may be stored within the same housing and be part of a single hardware component, and the single hardware component may also perform compression/decompression procedures. It is therefore intended that the foregoing description illustrates rather than limits this invention and that it is the following claims, including all of the equivalents, which define this invention:

What is claimed is:

1. A network access system comprising:
a home agent in communication with a user device via a user session;
an initiating security gateway in communication with the home agent; and
a terminating security gateway in communication with the initiating security gateway via a tunnel,
wherein a virtual local area network tag associated with the user session maps to a selector operable in a security policy database associated with an Internet Protocol Security protocol, and wherein the selector maps to a security policy stored within the security policy database.

2. The network access system of claim 1 further comprising an access server that authenticates the user device and provides the virtual local area network tag to the home agent.

3. The network access system of claim 1, wherein the security policy defines an Internet Protocol security procedure.

4. The network access system of claim 3, wherein the selector maps to the Internet Protocol security procedure, and the Internet Protocol security procedure is applied to the tunnel.

5. The network access system of claim 1, wherein the initiating security gateway further comprises a Quality of Service module that determines a Quality of Service marking for a packet that is sent along the tunnel.

6. The network access system of claim 1, wherein at least a portion of the network access system is a virtual private network.

7. The network access system of claim 1, wherein the user session passes between the user device and the home agent via a foreign agent.

8. The network access system of claim 1, wherein the terminating security gateway is part of a local area network.

9. The network access system of claim 1, wherein the selector includes at least one of an address and domain name associated with the network access system.

10. The network access system of claim 1, wherein the tunnel comprises at least one of an Internet Protocol security tunnel and an Internet Protocol in Internet Protocol tunnel.

11. A method for transmitting a packet via an initiating security gateway, the method comprising the steps of:
- receiving a packet including a virtual local area network tag associated with a user session;
- mapping the virtual local area network tag to a selector;
- mapping the selector to a security policy stored within a security policy database associated with an Internet Protocol Security protocol;
- performing an Internet Protocol security procedure based on the security policy; and
- transmitting the packet to a terminating security gateway across a tunnel.

12. The method of claim 11 further comprising marking the packet with a Quality of Service marking.

13. The method of claim 11, wherein performing an Internet Protocol security procedure comprises adding at least one of an authentication header and encapsulated security payload to the packet.

14. The method of claim 11, wherein performing an Internet Protocol security procedure comprises creating an Internet Protocol security tunnel.

15. The method of claim 11, wherein the selector is an address of the terminating security gateway.

16. The method of claim 15 further comprising creating an Internet Protocol in Internet Protocol tunnel utilizing the address of the terminating security gateway as a destination address.

17. The method of claim 11, wherein the selector is a domain name associated with the terminating security gateway.

18. The method of claim 11 further comprising performing a reverse Internet Protocol security procedure at the terminating gateway to obtain data stored within the packet.

19. The method of claim 11 further comprising a computer readable medium having stored therein instructions for causing a processor to execute the steps of the method of claim 11.

20. A network system comprising:
- a home agent in communication with a user device via a user session;
- an access server that authenticates the user device and provides a virtual local area network tag for the user session to the home agent;
- an initiating security gateway that receives a packet including the virtual local area network tag from the home agent, wherein the initiating security gateway includes a selector table mapping the virtual local area network tag to a selector;
- a security policy database that is associated with a Internet Protocol Security protocol, wherein the security policy database maps the selector to at least one security policy defining an Internet Protocol security procedure, wherein the Internet Protocol security procedure is applied to the packet; and
- a receiving network including a terminating security gateway that receives the packet from the initiating security gateway via a tunnel.

21. The network system of claim 20, wherein the initiating security gateway further comprises a Quality of Service module that determines a Quality of Service marking for the packet.

22. The network system of claim 20, wherein the initiating security gateway further comprises an Internet Protocol security module for creating at least one of an authentication header and encapsulating security payload for the packet.

23. The network system of claim 20, wherein the access server stores a user profile for the user device that maps the virtual local area network tag to a network domain.

24. The network system of claim 20, wherein the user device receives the virtual local area network tag from the access server and stores the information in a mobility binding record.

25. The network system of claim 20, wherein the initiating security gateway receives and recognizes Ethernet frames that have virtual local area network tags.

26. The network system of claim 20, wherein the tunnel comprises at least one of an Internet Protocol in Internet Protocol tunnel and an Internet Protocol security tunnel.

27. The network system of claim 20, wherein at least a portion of the network system is a virtual private network.

28. An initiating security gateway comprising:
- a selector module including a filtering mechanism for identifying a virtual local area network tag associated with a user session within a packet and a selector table for mapping the virtual local area network tag to a selector;
- a security policy database associated with an Internet Protocol Security protocol for mapping the selector to an Internet Protocol security policy; and
- an Internet Protocol Security module for applying the Internet Protocol security policy to the packet while sending the packet to a terminating security gateway.

29. The initiating security gateway of claim 28 further comprising a Quality of Service module that includes a Quality of Service table, wherein at least one of the virtual local area network tag and the selector maps to a Quality of Service marking within the Quality of Service table.

30. The initiating security gateway of claim 29, wherein the Quality of Service module marks the packet with the Quality of Service marking before sending the packet to the terminating security gateway.

31. The initiating security gateway of claim 28, wherein the Internet Protocol security module creates an Internet Protocol security tunnel for sending the packet to the terminating security gateway.

32. The initiating security gateway of claim 28, wherein the Internet Protocol security module adds at least one of an authentication header and an encapsulated security payload to the packet before sending the packet to the terminating security gateway.

* * * * *